United States Patent
Moyer (10) Patent No.: US 9,459,977 B2
(45) Date of Patent: Oct. 4, 2016

(54) DATA PROCESSING SYSTEM WITH DEBUG CONTROL

(71) Applicant: William C. Moyer, Dripping Springs, TX (US)

(72) Inventor: William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 220 days.

(21) Appl. No.: 14/468,574

(22) Filed: Aug. 26, 2014

(65) Prior Publication Data

US 2016/0062862 A1    Mar. 3, 2016

(51) Int. Cl.
G06F 11/00 (2006.01)
G06F 11/263 (2006.01)
G06F 11/10 (2006.01)

(52) U.S. Cl.
CPC .............. G06F 11/263 (2013.01); G06F 11/10 (2013.01)

(58) Field of Classification Search
CPC .................................................... G06F 11/263
See application file for complete search history.

(56) References Cited

U.S. PATENT DOCUMENTS

| | | | |
|---|---|---|---|
| 8,255,741 B2 * | 8/2012 | Cypher ............... | G06F 11/1012 714/54 |
| 8,301,969 B2 | 10/2012 | Unno et al. | |
| 8,423,875 B2 | 4/2013 | O'Neill et al. | |
| 8,566,670 B2 | 10/2013 | Bacchin et al. | |
| 2006/0069959 A1* | 3/2006 | Schultz ............... | G06F 11/3644 714/35 |
| 2010/0332944 A1* | 12/2010 | Cypher ............... | G06F 11/1012 714/763 |
| 2011/0154111 A1* | 6/2011 | Beilmann ............. | G06F 11/362 714/34 |
| 2012/0089821 A1* | 4/2012 | Lee ..................... | G06F 11/3644 712/228 |
| 2013/0007563 A1* | 1/2013 | Park ..................... | G06F 11/1012 714/758 |
| 2013/0227256 A1 | 8/2013 | Robertson et al. | |
| 2013/0283123 A1 | 10/2013 | Gara et al. | |
| 2013/0346798 A1* | 12/2013 | Moyer ................. | G06F 11/1008 714/27 |

* cited by examiner

Primary Examiner — Christopher McCarthy (57) ABSTRACT

A data processing system includes a processor configured to execute processor instructions and a memory. The memory has a data array and a checkbit array wherein each entry of the checkbit array includes a plurality of checkbits and corresponds to a storage location of the data array. The system includes error detection/correction logic configured to, during normal operation, detect an error in data access from a storage location of the data array using the plurality of checkbits in the entry corresponding to the storage location. The system further includes debug logic configured to, during debug mode, use a portion of the plurality of the checkbits in the entry corresponding to the storage location to generate a breakpoint/watchpoint request for the processor.

20 Claims, 4 Drawing Sheets

| CHECKBITS | DATA BIT MASK | |
|---|---|---|
| | NORMAL OPERATION, ECC | DEBUG OPERATION, PARITY ACROSS 64-BITS, STORED CHECKBITS 2:9 USED FOR DEBUG BREAKPOINT/WATCHPOINTS |
| 0 | ffffffff_f0000000_00000000_000000a9 | ffffffff_ffffffff_00000000_00000000 |
| 1 | ff000000_0fffffff_00000000_00000095 | 00000000_00000000_ffffffff_ffffffff |
| 2 | 80fe0000_0fe00000_ffff800_000000c6 | 00000000_00000000_00000000_0000000a |
| 3 | 4081f800_0818f000_fc00007ff_f00000cc | 00000000_00000000_00000000_00000000 |
| 4 | 204107c0_04107c00_83e007c0_0ffc00ca | 00000000_00000000_00000000_00000000 |
| 5 | 1020843c_020843c0_421e043c_0f03f074 | 00000000_00000000_00000000_00000000 |
| 6 | 08104223_81042238_2111c223_88e38e65 | 00000000_00000000_00000000_00000000 |
| 7 | 04082112_60821126_10893112_649a6d33 | 00000000_00000000_00000000_00000000 |
| 8 | 02041089_50410895_0844a889_52555b3a | 00000000_00000000_00000000_00000000 |
| 9 | 01020844_b020844b_04225844_b12cb71b | 00000000_00000000_00000000_00000000 |

DATA PROCESSING SYSTEM WITH DEBUG CONTROL

BACKGROUND

1. Field

This disclosure relates generally to data processing systems, and more specifically, to data processing systems having debug control.

2. Related Art

As data processing systems grow in size and complexity, debugging becomes more challenging. For example, the overhead required for debug breakpoint or watchpoint logic is large, and cannot support a sufficient number of unique instructions and data breakpoints. Currently, breakpoints or watchpoints are implemented with control registers using, for example, base and mask address registers or upper/lower range registers and associated comparisons. The number of unique programmable regions or addresses are limited by the number of registers and increasing this number increases both size and cost of the integrated circuits. Therefore, a need exists for an improved mechanism for implementing breakpoints and watchpoints in a data processing system.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system, error detection/correction is commonly performed. For example, known types of error detection/correction include error correction codes (ECC) and Parity. Commonly, one form of ECC allows for single bit error detection and correction and double bit error detection (SECDED), and parity allows for single bit error detection. For ECC, a number of checkbits are generated and stored for each data element, and the checkbits are later used for performing error detection and correction when the data element is accessed. For parity, a single parity bit is generated and stored for each data element which is later used for performing error detection when the data element is accessed. In one embodiment, a checkbit array is used with a data array in which each memory line of the data array has a corresponding set of checkbits stored within the checkbit array. In one embodiment, during debug, one or more bits of the checkbit array are reconfigured (i.e. repurposed) from their normal purpose of performing error detection/correction for the corresponding memory line of the data array, to now function as a way for setting breakpoints (or watchpoints) for the corresponding memory line. For example, one or more of the checkbits can be repurposed for causing a breakpoint (or watchpoint) to occur when a memory location of the corresponding line is accessed (for data breakpoints) or when the instruction stored at a slot in the corresponding line is decoded for execution (for instruction breakpoints). In one embodiment, any remaining checkbits which are not repurposed for debug can be used to perform less robust error checking, such as parity checking. This results in less robust error checking capabilities during debug but provides improved debug capabilities. Note that, as used herein, error correction/detection is used to indicate that error detection is performed, and that error correction may or may not be performed upon detecting an error.

Figure 1:
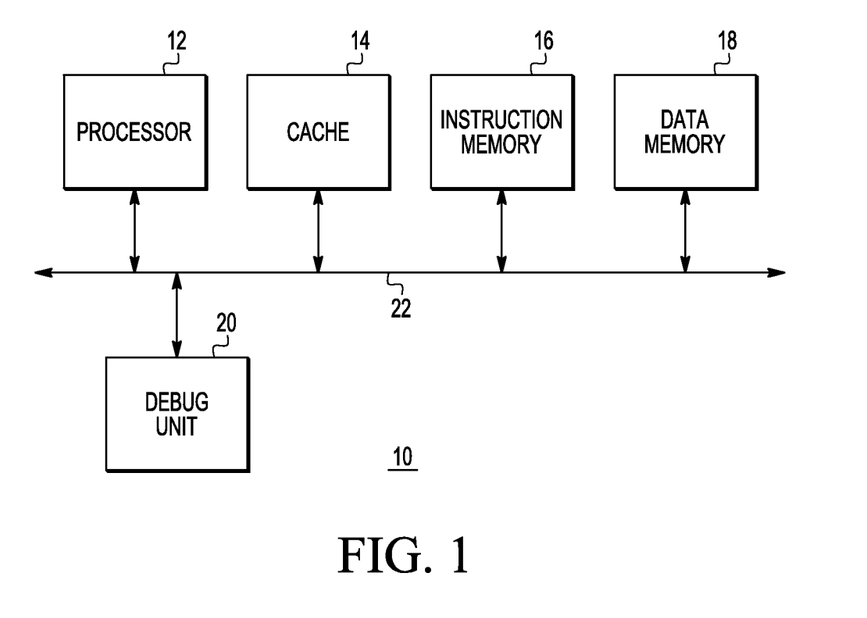
FIG. 1 illustrates, in block diagram form, a data processing system having a processor, a cache, an instruction memory, a data memory, and a debug unit in accordance with one embodiment of the present invention.

FIG. 1 illustrates, in block diagram form, a data processing system 10 in accordance with one embodiment of the present invention. Data processing system 10 includes a processor 12, a cache 14, an instruction memory 16, a data memory 18, a debug unit 20, and a system interconnect 22. Processor 12, cache 14, instruction memory 16, data memory 18, and debug unit 20 are bidirectionally coupled to interconnect 22. In one embodiment, interconnect 22 is implemented as a bus. Alternatively, interconnect 22 may be a crossbar switch. Processor 12 may be any type of processor, and may operate as the central processing unit of data processing system 10. Instruction memory 16 stores instructions which are executed by processor 12 and data memory 18 stores data used by processor 12 during execution of the instructions. Note that data processing system 10 may include different modules or additional modules, such as, for example, one or more additional processors, memories, peripherals, input/output units, etc. In an alternate embodiment, all or a portion of debug unit 20 may be implemented within processor 12.

In operation, processor 12 performs a variety of data processing functions by executing data processing instructions which are fetched from instruction memory 16. As will be described below, information stored in instruction memory 16 and data memory 18 may be checked by an error detection scheme such as ECC or parity. In some cases, such as with ECC, a detected error may further be corrected. Debug unit 20, when in a debug mode, can monitor addresses and data on interconnect 22 or monitor other portions of data processing system 10 and can selectively generate breakpoint or watchpoint requests based on debug control information. Operation of data processing system 10 will be described in more detail with respect to FIGS. 2-6 below.

Figure 2:
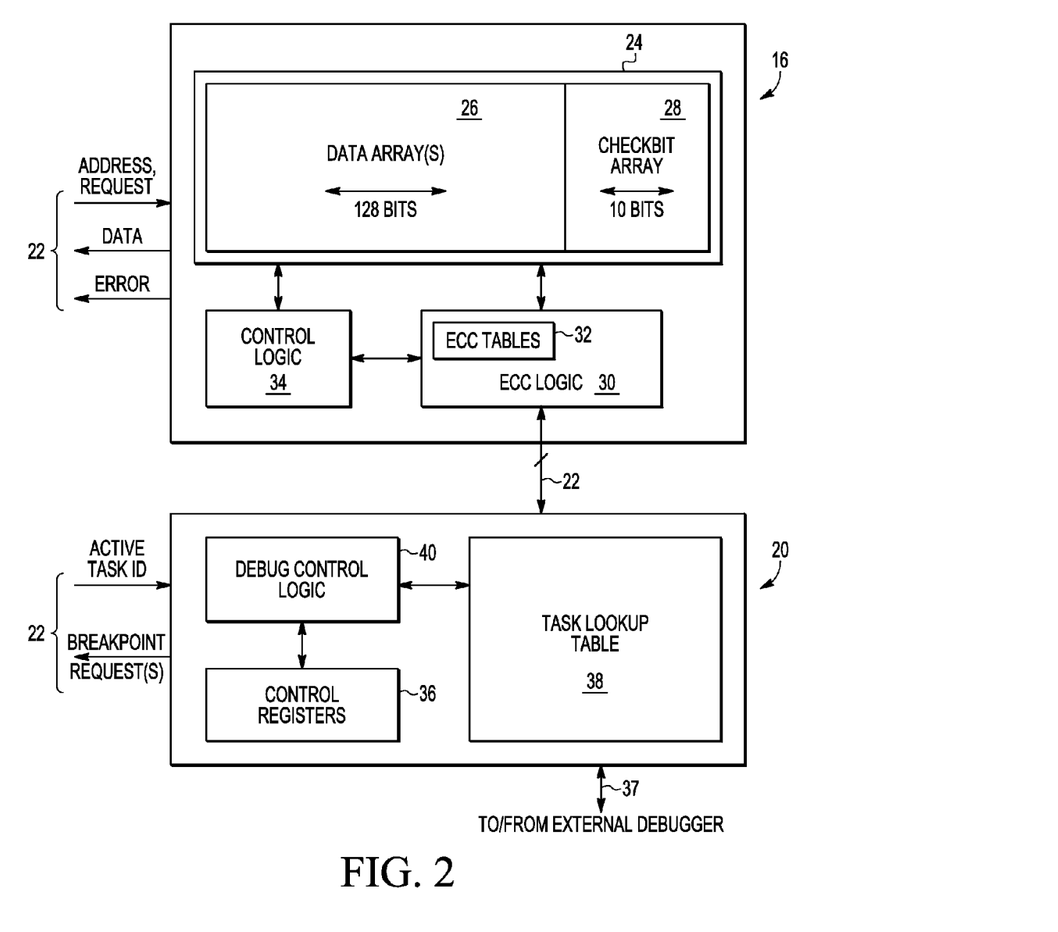
FIG. 2 illustrates, in block diagram form, the debug unit and the instruction memory of FIG. 1 in accordance with one embodiment of the present invention.

FIG. 2 illustrates, in block diagram form, instruction memory 16 and debug unit 20, in accordance with one embodiment of the present invention. Instruction memory 16 receives an access address and request from processor 12 by way of interconnect 22 and provides data and an error indicator to processor 12 by way of interconnect 22. Instruction memory 16 includes a memory array 24 which includes a data array 26 and a checkbit array 28. Since memory 16 is an instruction memory, each line of data array 26 stores instructions. In the illustrated embodiment, data array 26 is 128 bits wide and checkbit array is 10 bits wide. However, these values may differ for different implementations. Instruction memory 16 also includes control logic 34 and ECC logic 30. ECC logic 30 includes storage circuitry or other logic which stores or implements the functions in ECC tables 32. Control logic 34 is bidirectionally coupled to memory array 24 and ECC logic 30, and ECC logic 30 is bidirectionally coupled to memory array 24. Each of control logic 34 and ECC logic 30 can access data array 26 and checkbit array 28. Debug unit 20 includes debug control logic 40, control register 36, and task lookup table 38. Debug control logic 40 is bidirectionally coupled to each of control register 36 and task lookup table 38. In some embodiments, as will be described below, task lookup table 36 may not be present. Debug unit 20 receives an active task ID from processor 12 by way of interconnect 22, and provides breakpoint (or watchpoint) requests to processor 12 by way of interconnect 22. Note that breakpoint and watchpoint requests are generated in similar manners. In response to a breakpoint request, processor 12 halts execution so that debug operations may be performed. In response to a watchpoint request, processor 12 does not halt execution but may perform other debug operations in response thereto. For example, information about data processing system 10 may be recorded or other steps may be taken. However, for ease of explanation, the description herein will refer to the generation of breakpoint requests in which the same descriptions will apply to the generation of watchpoint requests. Therefore, these requests may be referred to as breakpoint/watchpoint requests. Debug unit 20 also includes an external interconnect 37 to provide information to and from an external debugger (not illustrated).

Figure 3:
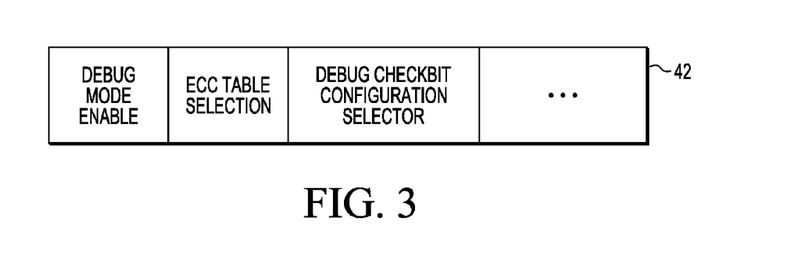
FIG. 3 illustrates, in diagrammatic form, a control register in accordance with one embodiment of the present invention.

FIG. 3 illustrates control register 42 which includes a debug mode enable field, an ECC table selection field, and a debug checkbit configuration selector. Processor 12 is able to write to these fields to configure operation of debug unit 20 and ECC logic 30. Note that this register may be located anywhere within data processing system 10 that is accessible by processor 12, ECC logic 30, and debug control logic 40. For example, in one embodiment, it may be located within control registers 36 of debug unit 20. Furthermore, these fields may be located in different registers where each register can be located anywhere within data processing system 10. To enable debug mode, processor 12 asserts the debug mode enable field by, for example, storing a logic level one in the field. The ECC table selection field may be a multiple bit field used to select a particular ECC table. Therefore, the number of bits used depends on the number of tables available for selection. The debug checkbit configuration selector may also be a multiple bit field which is used to select a particular debug checkbit configuration, as will be described below. Processor 12 may write to each of these fields as needed.

Figure 4:
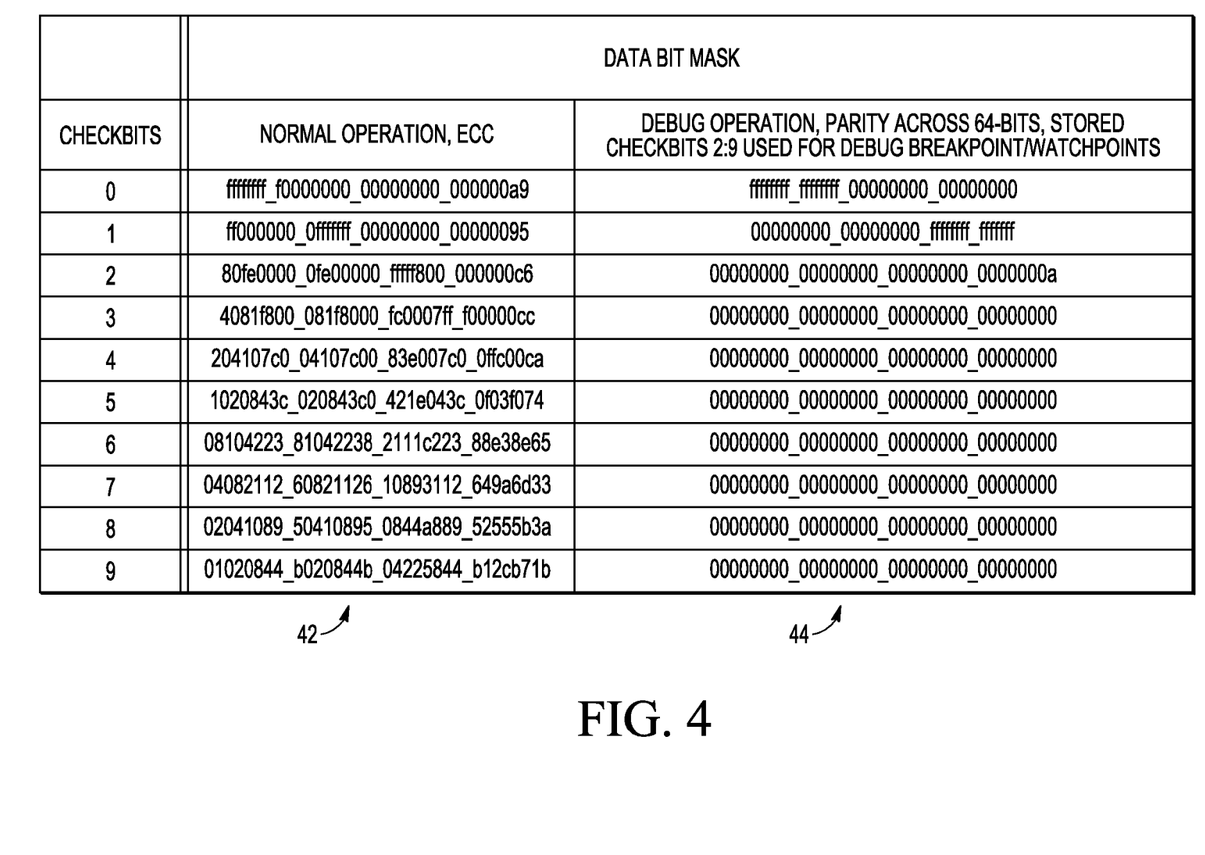
FIG. 4 illustrates in table form, data bit masks for error detection and correction code (ECC) during normal operation, and for parity error as well as a breakpoint or watchpoint generation during debug mode in accordance with one embodiment of the present invention.

FIG. 4 provides an example ECC table 42 which may be used for ECC during normal operation. ECC table 42 may be stored in ECC tables 32. In the current example, each time any part of a line in data array 26 is updated with a store, ECC logic 30 generates 10 checkbits to be stored in a corresponding location of checkbit array 28. Table 42 provides the data bit mask used in generating the corresponding checkbit of the 10 checkbits. The values for the data bit masks in table 42 are provided in hexadecimal format. In generating each of checkbit 0-9, the appropriate data mask from table 42 is applied to the 128 bits of data. For example, a bit-wise AND is performed with the data mask and the data. The result of the ANDing is then used in accordance with an ECC function to generate the corresponding checkbit. Note that any ECC function and any set of data bit masks may be used. In one embodiment, each bit-wise AND result of the data ANDed with the data mask for a given checkbit, is exclusive-ORed (XORed) together to form a single checkbit value.

In operation, instructions from data array 26 are fetched by processor 12. For example, during the fetch stage of processor 12, processor 12 provides an address location and read request to control logic 34, and in response to the read request, control logic 34 directs data array 26 to output the 128 bit memory line corresponding to the requested address location along with the corresponding checkbits from checkbit array 28 to ECC logic 30. Note that in the case of 16-bit instructions, the 128 bit memory line from data array 26 includes 8 instructions. During normal operation (i.e. when not in debug mode), ECC logic 30 uses the 10 stored checkbits to perform ECC on the received 128 bits of data (i.e. the received instructions). For each checkbit 0-9, the corresponding data bit mask, as listed in table 42, is applied to the 128 bits of data, and the result is used in accordance with the ECC function to generate a checkbit. A comparison is then made with the received checkbits to generate an error syndrome, to determine if an error occurred. In some cases, such as if only a single bit error is detected, the error syndrome value can be used to generate the corrected data. Therefore, if no error is detected in the received instructions, the instructions are provided to processor 12 by way of the data output to interconnect 22. In this case, the error indicator on interconnect 22 is negated to indicate that no error was detected. If an error is detected and is not corrected (or cannot be corrected), the error indicator is asserted on interconnect 22 to indicate to processor 12 that an error occurred during the current fetch and that the data on the data output is not correct. If an error is detected and corrected, ECC logic 30 provides the corrected instructions by way of the data output to interconnect 22 and the error indicator is negated.

Note that different ECC schemes may be used in different instances within data processing system 10. Each ECC scheme may have a corresponding ECC table which provides the data bit mask coding scheme and a corresponding ECC function used in generating each checkbit. Therefore, ECC logic 30, in performing the ECC, selects the appropriate ECC table from ECC tables 32.

Figure 5:
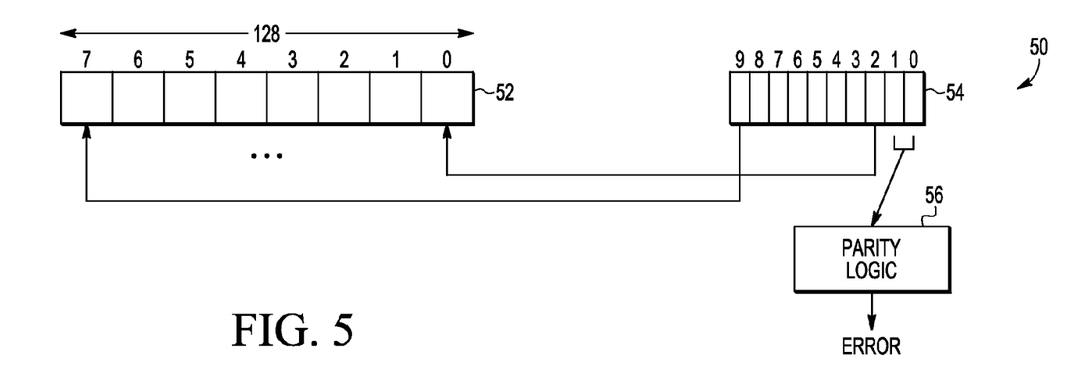
FIG. 5 illustrates, in block diagram form, debug checkbit generation logic in accordance with one embodiment of the present invention.
Figure 6:
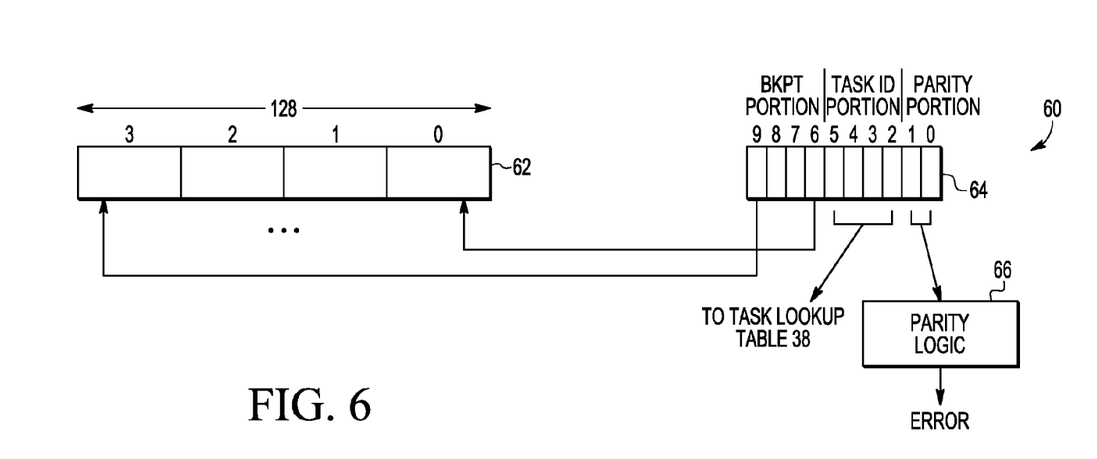
FIG. 6 illustrates, in block diagram form, debug checkbit generation logic in accordance with one embodiment of the present invention.

During debug mode, one or more of the checkbits can be repurposed for use in debug by debug unit 20. Table 44 of FIG. 4 illustrates an example table which may be used during debug for error detection. The values for the data bit masks in table 44 are provided in hexadecimal format. During debug, error detection/correction may be of less importance as compared to normal operation. Therefore, in one embodiment, the checkbits may all be repurposed for use by debug unit 20 in which none are used for error detection/correction. However, in the illustrated embodiment, checkbits 0 and 1 are used to supply minimum error detection capabilities for the 128 bits. For example, as illustrated in the first two rows of table 44, parity can be provided across 64 bits. A first parity bit can be provided for the left most 64 bits (corresponding to checkbit 0 and generated using the corresponding data mask in the first row), and a second parity bit can be provided for the right most 64 bits (corresponding to checkbit 1 and generated using the corresponding data bit mask in the second row). Therefore, checkbits 0 and 1 correspond to parity bits which are generated and stored into checkbit array 28 when the corresponding data is stored in data array 26. (Note that the remaining data bit mask entries for checkbits 2-9 are set to all 0's, and the use of all 0's has no affect on error detection/correction such that the checkbits calculated during error detection/correction are forced to 0.) Therefore, during debug, the remaining 8 checkbits 2-9 are freed up and can be used to provide debug breakpoint or watchpoint indicators. The available checkbits which are repurposed for debug may be utilized in accordance with a variety of different debug checkbit configurations. FIGS. 5 and 6 provide examples of various configurations. The configurations of FIGS. 5 and 6 correspond to the 128 bit data in data array 26 and 10 corresponding checkbits in checkbit array 28.

FIG. 5 illustrates a debug checkbit configuration 50 in accordance with one embodiment of the present invention. Configuration 50 illustrates an example entry 52 of data array 26 and a corresponding checkbit entry 54 of checkbit array 28. For configuration 50, table 44 of FIG. 4 may apply during debug mode. In configuration 50, during debug mode, each checkbit 2-9 corresponds to a particular 16-bit half word of the instructions in entry 52. That is, checkbit 2 corresponds to halfword 0, checkbit 3 to halfword 1, checkbit 4 to halfword 2, checkbit 5 to halfword 3, checkbit 6 to halfword 4, checkbit 7 to halfword 5, checkbit 8 to halfword 6, and checkbit 9 to halfword 7. Therefore, during a read while in debug mode, checkbits 0-9 may be provided to debug unit 20 as well as ECC logic 30. Checkbits 0 and 1 can be provided to parity logic 56 (which may be located within ECC logic 30). Note that, in accordance with the data masks of checkbits 2-9, these checkbits would not have any effect on error detection/correction. Checkbits 2-9 may be used by debug unit to indicate when a software debug breakpoint exception or a watchpoint signal output should be signaled back to the instruction fetch unit of processor 12. The indications may be signaled back to processor 12 by way of breakpoint request(s) on interconnect 22, as illustrated in FIG. 2. Debug control logic 40 can monitor address and data on interconnect 22 and when an attempt is made to execute a halfword as an instruction whose corresponding repurposed checkbit is set (i.e. asserted), debug control logic 40 can signal the breakpoint or watchpoint back to processor 12. Therefore, for debug, debug unit 20 may set (i.e. assert) checkbits within checkbit array 28 to set up desired breakpoints/watchpoints. The checkbits that are asserted correspond to those halfwords needing to be monitored for generation of a breakpoint or watchpoint request.

Configuration 50 may also be used in the case in which data array 26 is for a data memory (such as data memory 18) rather than an instruction memory. In this case, a breakpoint or watchpoint is signaled when the address location of a halfword of data of entry 52 whose corresponding checkbit is asserted is accessed. Therefore, note that data memory 18 may include an arrangement similar to that of instruction memory 16. For example, data memory 18 may also include a memory array which includes a data array and a checkbit array, similar to memory array 24. The data array of data memory 18 stores data for use in executing instructions rather than instructions. Data memory 18 may also include control logic, such as control logic 34, and ECC logic such as ECC logic 30 (which may also include ECC tables such as ECC tables 32). Debug unit 20 may therefore also be coupled to data memory 18 in a similar fashion as coupled to instruction memory 16.

FIG. 6 illustrates a debug checkbit configuration 60 in accordance with one embodiment of the present invention. Configuration 60 illustrates an example entry 62 of data array 26 and a corresponding checkbit entry 64 of checkbit array 28. As with configuration 50, for configuration 60, table 44 of FIG. 4 may apply during debug mode. In configuration 60, during debug mode, checkbits 0 and 1 operate as described in reference to configuration 50 and may be provided to parity logic 66 (which may be located within ECC logic 30) for error detection. Each of checkbits 6-9 correspond to a particular 32-bit word of entry 62 on which to take exceptions. That is, checkbit 6 corresponds to word 0, checkbit 7 to word 1, checkbit 8 to word 2, and checkbit 9 to word 3. Debug control logic 40 can monitor address and data on interconnect 22 and when an attempt is made to execute a word as an instruction whose corresponding repurposed checkbit is set (i.e. asserted), debug control logic 40 can signal the breakpoint or watchpoint back to processor 12.

In configuration 60, during debug mode, checkbits 2-5 is used as a task identifier portion. In one embodiment, these four bits may be used to identify one of 16 tasks within processor 12 which should be interrupted in case of an exception. In another embodiment, these four bits may be used as an index into task lookup table 38 which stores per-task control indicating whether a breakpoint should be taken for a given task when a portion of memory location 62 is accessed. In one embodiment, a default value may be used, such as all 0s, such that when the four bits are set to the default value, any of the 16 tasks may be interrupted. In this case, the current active task (indicated by the active task ID by processor 12 to debug unit 20) can be interrupted if any of checkbits 6-9 is set. Therefore, in determining that a breakpoint or watchpoint should be signaled to processor 12, debug control logic 40 may further qualify a set checkbit based on the task identifier portion for an accessed storage location and the active task ID received from processor 12 via interconnect 22. Therefore, for debug, debug unit 20 may set (i.e. assert) checkbits within checkbit array 28 to set up desired breakpoints/watchpoints and may store an appropriate value for the task identifier portion. The checkbits that are asserted correspond to those words needing to be monitored for generation of a breakpoint or watchpoint request for a selected task when checkbits 2-5 are used as a task identifier portion, or for a selected subset of tasks defined by the content of task lookup table 38 which is indexed by the four bits of checkbits 2-5. Note that each individual entry of data array 26 (such as entry 64) may be configured independently of other entries in data array 26 for the purpose of determining the appropriate task ID and breakpoint control information contained in a corresponding entry of checkbit array 28. That is, each instruction portion in a given entry of data array 26 may be individually controlled to generate a breakpoint/watchpoint condition when used, and each group of instructions within a given entry of data array 26 may indicate a unique task ID portion.

Configuration 60 may also be used in the case in which data array 26 is for a data memory (such as data memory 18) rather than an instruction memory. In this case, a breakpoint or watchpoint is signaled when the address location of a word of data of entry 62 whose corresponding checkbit (of checkbits 6-9) is asserted is accessed.

In one embodiment, any number of debug checkbit configurations may be implemented by debug unit 20. For example, each of configurations 50 and 60 may be implemented in which a particular debug checkbit configuration can be indicated by debug checkbit configuration selector field in control register 42.

In order to repurpose some or all of the checkbits during debug, checkbit array 28 is made accessible to debug software to set the checkbits as needed. Also, in one embodiment, during debug mode, ECC may be completely disabled in which no error checking is performed. After exiting debug mode, the repurposed checkbits revert back to ECC usage. At this point, debug control logic 40, using the selected ECC table indicated by the ECC table selection field in control register 42, can restore or recalculate the proper checkbit encodings for each of checkbits 0-9 for each entry in checkbit array 28.

Therefore, note that during debug mode, the checkbits in checkbit array 28 may be repurposed as needed for use in debug. For example, a portion may be repurposed for use generating breakpoint/watchpoint requests. Another portion may be repurposed for use in a different error detection/correction scheme for the corresponding memory line. Yet another portion may be used to further qualify a breakpoint/watchpoint request based on task information. Note that the number of bits used for any of these portions can vary based on the desired implementations. For example, in the case of qualifying the request based on task information, the number of repurposed checkbits required may be based on the number of tasks supported by data processing system 10. Furthermore, during normal operation, the checkbits of checkbit array 28 may correspond to other types of complex error detection/correction schemes other than ECC. However, regardless of what scheme is implemented by the checkbits in array 28 during normal operation, all or part may be repurposed during debug operation.

By now it should be appreciated that there has been provided a technique in which some or all of the ECC checkbits can be repurposed during debug mode to allow for increased debug capability. Furthermore, by repurposing checkbits during debug mode, additional debug registers, such as to define addresses or address ranges for which to generate breakpoints/watchpoints, are not needed to support an increased number of breakpoints/watchpoints within a data processing system. That is, existing bits within data processing system 10 are reused.

The terms "assert" or "set" and "negate" (or "deassert" or "clear") are used herein when referring to the rendering of a signal, bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also, in one embodiment, the illustrated elements of data processing system 10 are circuitry located on a single integrated circuit or within a same device. Alternatively, data processing system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a processor configured to execute processor instructions; a memory coupled to the processor, the memory having a data array and a checkbit array, wherein each entry in the checkbit array includes a plurality of checkbits and corresponds to a storage location of the data array; error detection/correction logic configured to, during normal operation, detect an error in data accessed from a storage location of the data array using the plurality of checkbits in the entry corresponding to the storage location; and debug logic configured to, during debug mode, use a portion of the plurality of the checkbits in the entry corresponding to the storage location to generate a breakpoint/watchpoint request for the processor. In one aspect, each checkbit of the portion of the plurality of checkbits corresponds to a portion of the storage location. In a further aspect, the debug logic, during debug mode, is configured to generate a breakpoint/watchpoint when a checkbit of the portion of the plurality of checkbits is asserted and an address of the corresponding portion of the storage location is accessed by the processor. In another further aspect, the debug logic, during debug mode, is configured to generate a breakpoint/watchpoint when a checkbit of the portion of the plurality of checkbits is asserted and an instruction stored in the corresponding portion of the storage location is executed by the processor. In another aspect of the above embodiment, the error detection/correction logic, during debug mode, is configured to use a second portion of the plurality of the checkbits in the entry corresponding to the storage location to detect an error in data accessed from the corresponding storage location of the data array, the portion and the second portion being mutually exclusive. In a further aspect, during normal operation, the error detection/correction logic is configured to perform a first type of error detection when using the plurality of checkbits, and during debug mode, the error detection/correction logic is configured to perform a second type of error detection when using the second portion of the plurality of checkbits. In yet a further aspect, the second type of error detection is less robust than the first type of error detection. In another yet further aspect, the first type of error detection is ECC and the second type of error detection is parity. In another aspect of the above embodiment, the debug logic, during debug mode, is configured to use a second portion of the plurality of the checkbits in the entry corresponding to the storage location to as a task identifier, the portion and the second portion being mutually exclusive, wherein the debug logic, during debug mode, is further configured to qualify generation of the breakpoint/watchpoint request based on the task identifier and a current active task of the processor. In another aspect of the above embodiment, the error detection/correction logic is configured to, during normal operation, use the plurality of checkbits in the entry corresponding to the storage location to perform error correction when an error in the data accessed from the storage location is detected. In yet another aspect, the memory is characterized as a data memory, and wherein the debug logic is configured to, during debug mode, access the checkbit array to assert checkbits corresponding to selected storage locations in which access of the selected storage locations results in generation of a breakpoint/watchpoint request. In yet another aspect, the memory is characterized as an instruction memory, and wherein the debug logic is configured to, during debug mode, access the checkbit array to assert checkbits corresponding to selected storage locations in which execution of an instruction stored in the selected storage locations results in generation of a breakpoint/watchpoint request.

In another embodiment, a data processing system includes accessing data from a storage location of a data array of a memory; accessing a plurality of checkbits from checkbit storage circuitry, the plurality of checkbits corresponding to the storage location of the data array; performing error detection on the accessed data using the plurality of checkbits; entering a debug mode, wherein in debug mode, each checkbit in a portion of the plurality of checkbits stored within the checkbit storage circuitry is repurposed for use in debug, wherein each repurposed checkbit corresponds to a portion of the storage location; and in debug mode, using the repurposed checkbits to generate breakpoint/watchpoint requests. In one aspect of the another embodiment, the memory is an instruction memory, and wherein the using the repurposed checkbits to generate breakpoint/watchpoint requests includes, in debug mode, when an instruction stored in a first portion of the storage location is executed and a repurposed checkbit corresponding to the first portion is asserted, generating a breakpoint/watchpoint request. In another aspect, the using the repurposed checkbits to generate watchpoint/breakpoint requests includes, in debug mode, when a first portion of the storage location is accessed and a repurposed checkbit corresponding to the first portion is asserted, generating a breakpoint/watchpoint request. In another aspect, in debug mode, each checkbit in a second portion of the plurality of checkbits is repurposed as a task identifier, the portion and the second portion of the plurality of checkbits being mutually exclusive, and wherein the using the repurposed checkbits to generate breakpoint/watchpoint requests further includes, in debug mode, qualifying a breakpoint/watchpoint request based on the task identifier in the second portion and a currently active task in the data processing system. In another aspect, upon entering the debug mode, asserting selected checkbits of the repurposed checkbits to set up breakpoint/watchpoints.

In yet another embodiment, a data processing system includes a processor configured to execute processor instructions; a memory coupled to the processor, the memory having a data array and a checkbit array, wherein each entry in the checkbit array includes a plurality of checkbits and corresponds to a storage location of the data array; error detection/correction logic configured to, during normal operation, detect an error using a first error detection type in data accessed from a storage location of the data array using the plurality of checkbits in the entry corresponding to the storage location, and, during debug mode, detect an error using a second error detection type in data accessed from the storage location of the data array using a first portion of the plurality of checkbits in the entry corresponding to the storage location, wherein the first and second error detection types are different types; and debug logic configured to, during debug mode, use a second portion of the plurality of the checkbits in the entry corresponding to the storage location to generate a breakpoint/watchpoint request for the processor, wherein the first and second portions are mutually exclusive. In one aspect of the yet another embodiment, the first error detection type is ECC and the second error detection type is parity. In another aspect, the debug logic, during debug mode, is configured to use a third portion of the plurality of the checkbits in the entry corresponding to the storage location to as a task identifier, the first, second, and third portions being mutually exclusive, wherein the debug logic, during debug mode, is further configured to qualify generation of the breakpoint/watchpoint request based on the task identifier and a current active task of the processor.

What is claimed is:
1. A data processing system, comprising:
   a processor configured to execute processor instructions;
   a memory coupled to the processor, the memory having a data array and a checkbit array, wherein each entry in the checkbit array includes a plurality of checkbits and corresponds to a storage location of the data array;
   error detection/correction logic configured to, during normal operation, detect an error in data accessed from a storage location of the data array using the plurality of checkbits in the entry corresponding to the storage location; and
   debug logic configured to, during debug mode, use a portion of the plurality of the checkbits in the entry corresponding to the storage location to generate a breakpoint/watchpoint request for the processor.

2. The data processing system of claim 1, wherein each checkbit of the portion of the plurality of checkbits corresponds to a portion of the storage location.

3. The data processing system of claim 2, wherein the debug logic, during debug mode, is configured to generate a breakpoint/watchpoint when a checkbit of the portion of the plurality of checkbits is asserted and an address of the corresponding portion of the storage location is accessed by the processor.

4. The data processing system of claim 2, wherein the debug logic, during debug mode, is configured to generate a breakpoint/watchpoint when a checkbit of the portion of the plurality of checkbits is asserted and an instruction stored in the corresponding portion of the storage location is executed by the processor.

5. The data processing system of claim 1, wherein the error detection/correction logic, during debug mode, is configured to use a second portion of the plurality of the checkbits in the entry corresponding to the storage location to detect an error in data accessed from the corresponding storage location of the data array, the portion and the second portion being mutually exclusive.

6. The data processing system of claim 5, wherein:
during normal operation, the error detection/correction logic is configured to perform a first type of error detection when using the plurality of checkbits, and
during debug mode, the error detection/correction logic is configured to perform a second type of error detection when using the second portion of the plurality of checkbits.

7. The data processing system of claim 6 wherein the second type of error detection is less robust than the first type of error detection.

8. The data processing system of claim 6, wherein the first type of error detection is ECC and the second type of error detection is parity.

9. The data processing system of claim 1, wherein the debug logic, during debug mode, is configured to use a second portion of the plurality of the checkbits in the entry corresponding to the storage location to as a task identifier, the portion and the second portion being mutually exclusive, wherein the debug logic, during debug mode, is further configured to qualify generation of the breakpoint/watchpoint request based on the task identifier and a current active task of the processor.

10. The data processing system of claim 1, wherein the error detection/correction logic is configured to, during normal operation, use the plurality of checkbits in the entry corresponding to the storage location to perform error correction when an error in the data accessed from the storage location is detected.

11. The data processing system of claim 1, wherein the memory is characterized as a data memory, and wherein the debug logic is configured to, during debug mode, access the checkbit array to assert checkbits corresponding to selected storage locations in which access of the selected storage locations results in generation of a breakpoint/watchpoint request.

12. The data processing system of claim 1, wherein the memory is characterized as an instruction memory, and wherein the debug logic is configured to, during debug mode, access the checkbit array to assert checkbits corresponding to selected storage locations in which execution of an instruction stored in the selected storage locations results in generation of a breakpoint/watchpoint request.

13. In a data processing system, a method comprising:
accessing data from a storage location of a data array of a memory;
accessing a plurality of checkbits from checkbit storage circuitry, the plurality of checkbits corresponding to the storage location of the data array;
performing error detection on the accessed data using the plurality of checkbits;
entering a debug mode, wherein in debug mode, each checkbit in a portion of the plurality of checkbits stored within the checkbit storage circuitry is repurposed for use in debug, wherein each repurposed checkbit corresponds to a portion of the storage location; and
in debug mode, using the repurposed checkbits to generate breakpoint/watchpoint requests.

14. The method of claim 13, wherein the memory is an instruction memory, and wherein the using the repurposed checkbits to generate breakpoint/watchpoint requests comprises:
in debug mode, when an instruction stored in a first portion of the storage location is executed and a repurposed checkbit corresponding to the first portion is asserted, generating a breakpoint/watchpoint request.

15. The method of claim 13, wherein the using the repurposed checkbits to generate watchpoint/breakpoint requests comprises:
in debug mode, when a first portion of the storage location is accessed and a repurposed checkbit corresponding to the first portion is asserted, generating a breakpoint/watchpoint request.

16. The method of claim 13, wherein in debug mode, each checkbit in a second portion of the plurality of checkbits is repurposed as a task identifier, the portion and the second portion of the plurality of checkbits being mutually exclusive, and wherein the using the repurposed checkbits to generate breakpoint/watchpoint requests further comprises:
in debug mode, qualifying a breakpoint/watchpoint request based on the task identifier in the second portion and a currently active task in the data processing system.

17. The method of claim 13, wherein, upon entering the debug mode, asserting selected checkbits of the repurposed checkbits to set up breakpoint/watchpoints.

18. A data processing system, comprising:
a processor configured to execute processor instructions;
a memory coupled to the processor, the memory having a data array and a checkbit array, wherein each entry in the checkbit array includes a plurality of checkbits and corresponds to a storage location of the data array;
error detection/correction logic configured to, during normal operation, detect an error using a first error detection type in data accessed from a storage location of the data array using the plurality of checkbits in the entry corresponding to the storage location, and, during debug mode, detect an error using a second error detection type in data accessed from the storage location of the data array using a first portion of the plurality of checkbits in the entry corresponding to the storage location, wherein the first and second error detection types are different types; and
debug logic configured to, during debug mode, use a second portion of the plurality of the checkbits in the entry corresponding to the storage location to generate a breakpoint/watchpoint request for the processor, wherein the first and second portions are mutually exclusive.

19. The data processing system of claim 18, wherein the first error detection type is ECC and the second error detection type is parity.

20. The data processing system of claim 18, wherein the debug logic, during debug mode, is configured to use a third portion of the plurality of the checkbits in the entry corresponding to the storage location to as a task identifier, the first, second, and third portions being mutually exclusive, wherein the debug logic, during debug mode, is further configured to qualify generation of the breakpoint/watchpoint request based on the task identifier and a current active task of the processor.

\* \* \* \* \*